Figure 1:
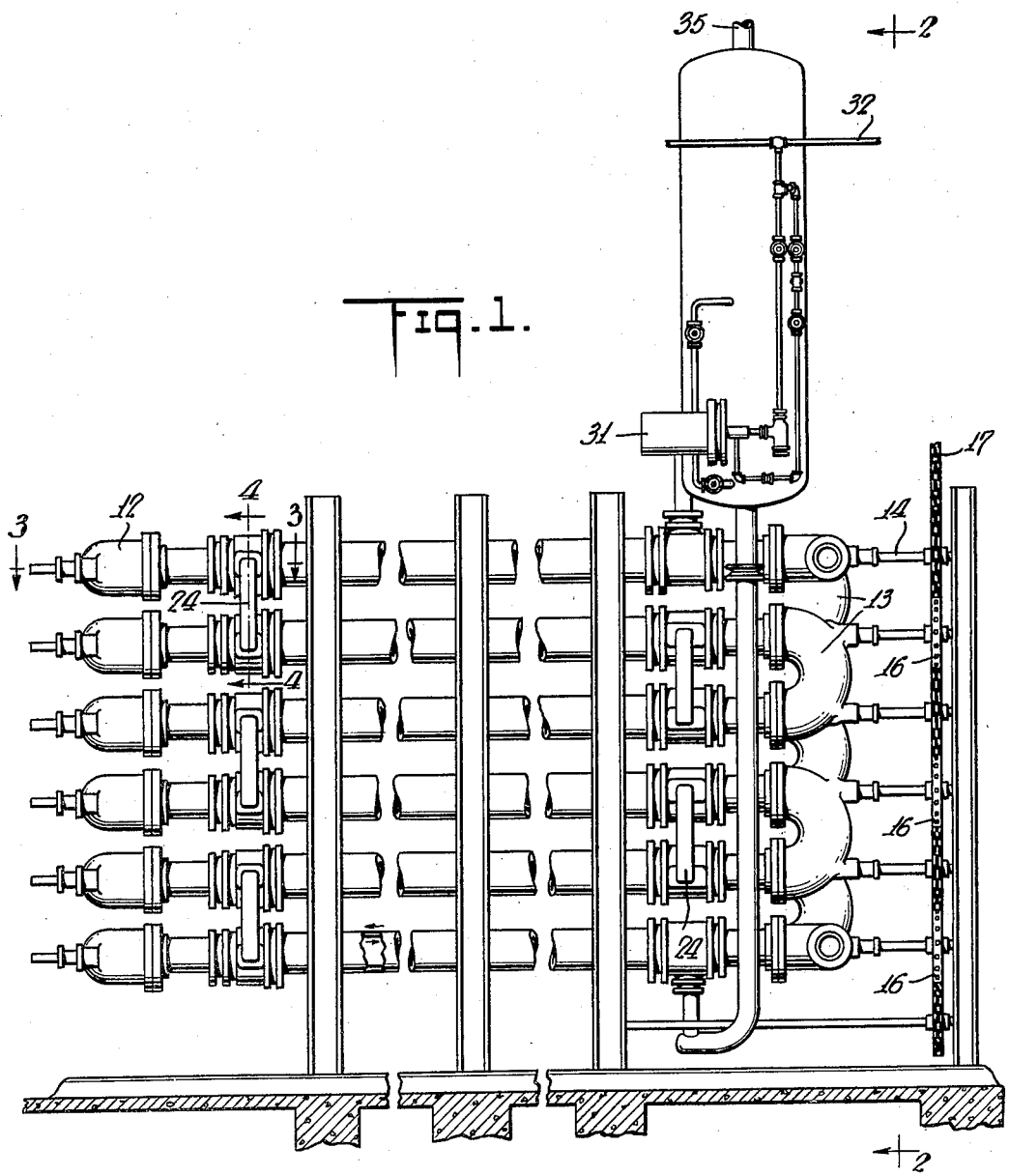

Dec. 4, 1934.  W. M. MORGAN  1,983,301
COOLING APPARATUS
Filed Sept. 16, 1931  2 Sheets-Sheet 1

INVENTOR
William M. Morgan
BY
ATTORNEYS

Dec. 4, 1934.    W. M. MORGAN    1,983,301
COOLING APPARATUS
Filed Sept. 16, 1931    2 Sheets-Sheet 2
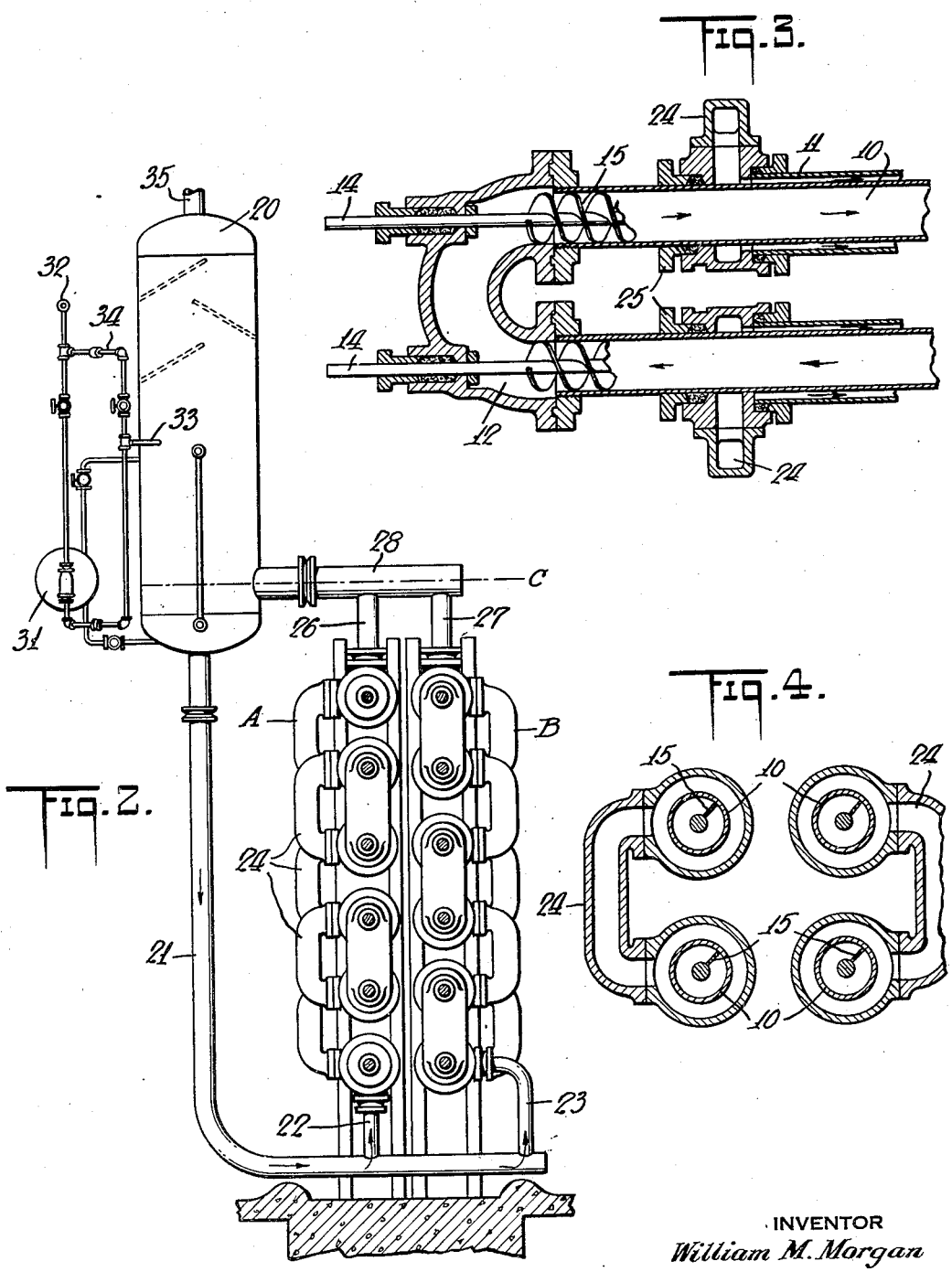

Patented Dec. 4, 1934

1,983,301

UNITED STATES PATENT OFFICE 1,983,301

COOLING APPARATUS

William M. Morgan, Tulsa, Okla., assignor to The Carbondale Machine Co., Carbondale, Pa., a corporation of Pennsylvania Application September 16, 1931, Serial No. 563,027

8 Claims. (Cl. 62—114)

The invention in its preferred form is an improvement on the general type of chilling apparatus shown in the Hiller Patent 922,898, and adapted for the treatment of liquids to effect congealation or separation of certain constituents thereof. Such an apparatus, for instance, is adapted for use in the chilling of distillates to separate paraffin, wax, or the like, the chilling being effectively obtained by delivering the liquid and a chilling agent through the separate zig-zag concentric passages of a countercurrent heat exchanger, and simultaneously scraping the congealed constituents from the walls of the passages. The present invention in certain of its broader aspects is not limited to the type of chilling apparatus above referred to, but may be used with other types. Heretofore, precooled brine has been used as the chilling agent in apparatus of this general type.

One object of the present invention is to provide a new and improved countercurrent heat interchanger, the cooling being effected by the direct evaporation of a volatile refrigerating agent, such as ammonia, into heat exchanging relationship with the liquid being treated, the conduit arrangement and circulation of the liquid and the refrigerating agent being such as to provide a long passage for the liquid to be cooled, but a much shorter passage for the refrigerant medium, whereby the minimum frictional resistance to the flow of said agent during its evaporation and the minimum back pressure on the gas are secured. By the term "countercurrent" is meant having the refrigerant inlet and outlet in heat exchange relationship with the liquid outlet and inlet respectively.

A further object is to provide a countercurrent heat interchanger in which the passages for the refrigerant form part of a flooded system, whereby the volatile liquid refrigerant may evaporate at all points along the length of the passage, and substantially the same temperature is maintained at the inlet for the liquid to be cooled as at the outlet for said liquid.

A further object is to provide a plurality of passages for the refrigerant, arranged in parallel, and each having sections arranged alternately with those of another passage for action on the liquid flowing through a single passage, whereby said liquid is cooled jointly by the action of the plurality of refrigerant passages.

In one embodiment of the present invention two vertical series of substantially horizontal concentric pipes are provided, the liquid to be treated flowing through the successive pipes of the two series alternately, while separate portions of the refrigerant cool the separate series.

As an important feature of the present invention, an accumulator is provided above the interchanger and the liquid ammonia is fed to the jackets of the lower pipes of the two separate series of pipes for the liquid being treated. The jackets are thus kept filled with the liquid ammonia which boils therein to produce the refrigerating effect. In this way a more direct and effective chilling means is provided. Also, a number of auxiliary units are dispensed with, and the power necessary for effecting the circulation of the chilling agent is reduced. Furthermore, the boiling of the ammonia in the jackets causes a turbulent condition which effects a more equal distribution of the heat transferred from the liquid being treated to the refrigerating agent.

In the accompanying drawings there is shown for the purpose of illustration, one embodiment of the present invention, in which drawings:

Fig. 1 is a side view, partly diagrammatic, of an apparatus embodying the present invention.

Fig. 2 is an end elevation, partly diagrammatic, of the apparatus shown in Fig. 1, and Figs. 3 and 4 are sections taken on lines 3—3 and 4—4 respectively of Fig. 1, but somewhat enlarged.

In the construction illustrated there are provided two vertical series A and B of concentric pipes, the pipes of the two series being arranged in horizontally adjoining pairs. The inner pipe 10 serves to conduct the liquid to be treated and the outer pipe 11 is mounted concentrically with respect thereto and forms an annular chamber therewith for the passage therethrough of a chilling agent. The horizontally adjoining pipes 10 of each pair are connected together at one end by a header or horizontal bend 12. At the opposite ends, vertically adjoining pipes are connected together in pairs by headers or vertical bends 13, the vertical bends of one series being arranged in staggered relationship with the vertical bends of the other series. In this manner, the liquid to be treated passes through the pipe 10 of one series, across its bend 12 to the horizontally adjoining pipe 10 of the other series, then along the full length of said latter pipe and down through its bend 13 to the vertical adjoining pipe below. The liquid thereby travels in alternate courses between the two series of pipes.

For scraping the congealed portions of the liquid from the inner surfaces of the pipes 10, each of the bends 12 and 13 has journaled therein shafts 14 which extend axially of the pipes 10 and carry spiral screw or ribbon conveyers 15 having the outer periphery thereof close to the inside surface of said pipes.

The shafts 14 may be rotated by any suitable means, as for instance by sprocket wheels 16 connected to one set of ends of said shafts and engaged by a chain 17 disposed in zig-zagged relationship between vertically adjoining wheels to rotate horizontally adjoining shafts 14 in opposite directions, the chain 17 being driven from any suitable source of power.

As an important feature of the present invention, the circulation of the refrigerating agent through the jackets of the pipes 10 is divided into two separate circuits in heat interchanging relationship with the two separate vertical series of pipes, the circulation of the agent being effected from the bottom upwardly, and in countercurrent relationship with the liquid being treated, the chilling of the liquid being accomplished by the direct evaporation of ammonia or similar volatile agent in said jackets.

The refrigerating system for chilling the liquid being treated includes an accumulator 20 having a pipe 21 connecting the bottom thereof to two branch pipes 22 and 23 extending to the separate inlets of the pipes 11 forming the jackets of the bottom run of the pipes 10. The two separate circuits for the refrigerating agent are formed by the annular chambers between the pipes 10 and 11, these chambers of each separate series being connected in series by any suitable means, as for instance by vertical couplings 24 having bores for embracing a pair of vertically adjoining pipes 10, and secured to the ends of a corresponding pair of vertically adjoining pipes 11 by packed sealing glands 25. The ammonia will thereby follow a general course counter to the course of the liquid being treated, and separately through each vertical series of jacket pipes. The upper outer pipes 11 of the two series of pipes A and B are provided with outlet conduits 26 and 27 respectively leading into a main conduit 28 connected to the side of the accumulator 20 above the liquid level therein.

The ammonia in the accumulator 20 is maintained approximately at the level C by means of a float control liquid inlet valve 31. The liquid ammonia may be led in from a condenser through a main feed line 32, and then either past the float valve in a chamber 31 communicating with the accumulator into the accumulator inlet pipe 33, or through a branch pipe 34 to said inlet pipe. A gas outlet 35 from the accumulator 20 is provided by means of which the gas from the liquid evaporated in said accumulator, as well as that evaporated in the pipes 11, is returned to the compressor or absorber. Said outlet 35 may have a valve to control the back pressure and therefore the temperature in the pipes 11, if desired.

In my improved apparatus the accumulator is mounted at such an elevation that the liquid level C is higher than the upper pipes of the heat interchanger, and therefore all of the jackets 11 are kept filled with the volatile refrigerant, and the boiling of such liquid can take place in the uppermost as well as in the lowermost pipes of the series, and the difference in temperature will be only that due to the difference in the back pressure on the gas.

By reason of the fact that the liquid to be cooled flows through all of the pipes of both series, a very effective cooling or refrigerating action is secured, but as the refrigerant does not cross over from one series to the other, the gas produced by evaporation in the jackets of the lowermost pipe, travels only about one-half the distance that the liquid to be cooled does, and the back pressure retarding such evaporation is correspondingly reduced.

The gas produced in the lower jackets in bubbling up through the unevaporated liquid refrigerant in the upper jackets, agitates said unevaporated liquid and this turbulence accelerates the refrigerating action.

In the left-hand vertical series of pipes shown in Fig. 2, the refrigerant agent travels in a direction opposite to the direction of travel of the liquid to be treated, in both the horizontal pipes and the vertical bends or couplings, while in the vertical series on the right-hand side shown in Fig. 2, the refrigerant agent in the horizontal pipe sections travels in the same direction as the liquid to be treated. In both series, the refrigerant and the liquid to be treated travel in counter-current relationship in accordance with the definition hereinbefore set forth.

Having thus described my invention, what I claim as new and desire to secure by Letters Patent is:—

1. An apparatus for chilling liquid to separate solids therefrom, including a plurality of straight pipe sections, headers connecting said sections in series to form a zig-zag conduit having a liquid inlet in the uppermost pipe section, and a liquid outlet in the lowermost pipe section, means for scraping solids from the interior of said pipe sections, outer pipe sections encircling said first mentioned pipe sections and forming jackets for said straight pipe sections, headers connecting said outer pipes in series, an accumulator above said pipes and having a feed conduit leading to the jacket of the lowermost pipe section near the liquid outlet end thereof for delivering volatile liquid refrigerant and maintaining said jackets flooded with said liquid refrigerant, and a gas return conduit leading from the jacket of the top pipe section to said accumulator.

2. An apparatus for chilling liquid, including a plurality of straight pipe sections, headers connecting said sections in series to form a zig-zag conduit having a liquid inlet in the uppermost pipe section and a liquid outlet in the lowermost pipe section, outer pipe sections encircling said first mentioned pipe sections and forming jackets for said straight pipe sections, headers connecting said outer pipes in series, an accumulator above said pipes and having a feed conduit leading to the jacket of the lowermost pipe section near the liquid outlet end thereof for delivering volatile liquid refrigerant and maintaining said jackets flooded with said liquid refrigerant, and a gas return conduit leading from the jacket of the top pipe section to said accumulator.

3. An apparatus for chilling liquids to separate solid material therefrom, including two vertical series of pipes, headers connecting the ends of said pipes in series to form a liquid conduit extending alternately from one series to the other, means for scraping solids from the interior of said conduit, an outer pipe section encircling each of said first mentioned pipes and forming therewith jackets, said outer pipes being connected by headers to form separate zig-zag conduits each in heat interchanging relationship with a separate one of said series, and means for flooding said jackets with a volatile liquid refrigerant.

4. An apparatus for chilling liquids, including two vertical series of pipes, headers connecting the ends of said pipes in series to form a liquid conduit extending alternately from one series to the other, an outer pipe section encircling each of said first mentioned pipes, and forming therewith jackets, said outer pipes being connected by headers to form separate zig-zag conduits each in heat interchanging relationship with a separate one of said series, and means for flooding said jackets with a volatile liquid refrigerant.

5. An apparatus for chilling liquid to separate solids therefrom, including a plurality of straight pipe sections, headers connecting said sections in series to form a zig-zag conduit, a screw conveyer for advancing the separated solids in said pipe sections, outer pipe sections encircling said first mentioned pipe sections and forming jackets for said straight pipe sections, headers connecting said outer pipes in series to form a zig-zag conduit, a volatile liquid refrigerant receptacle above said pipes and having a feed conduit leading to the jacket of the lowermost pipe section for maintaining said jackets flooded with said volatile liquid refrigerant, and a gas return conduit leading from the jacket of the top pipe section to said volatile liquid refrigerant receptacle.

6. An apparatus for chilling liquids, including two vertical series of pipes, headers connecting the ends of said pipes in series to form a conduit, extending alternately from one series to the other, an outer pipe section encircling each of said pipes to form therewith a jacket, said pipes being connected by headers to form separate conduits, each of which is associated with one only of said vertical series of pipes, and means for delivering liquid refrigerant into each of said last mentioned conduits at the lower end thereof for evaporation in said jackets.

7. A liquid chilling apparatus including two vertical series of pipes, headers connecting the ends of said pipes in series to form a conduit extending alternately from one series to the other, jackets encircling each of said pipes, said jackets being connected by headers to form two separate conduits each associated with the pipes of a separate vertical series of said pipes, and means for flooding said last mentioned conduits with a volatile refrigerant.

8. A liquid chilling apparatus including two vertical series of pipes, headers connecting the ends of said pipes in series to form a conduit extending alternately from one series to the other, jackets encircling each of said pipes, said jackets being connected by headers to form two separate conduits, each associated with the pipes of a separate vertical series of said pipes, a liquid refrigerant accumulator above said jackets, liquid supply connections between the bottom of said accumulator and the separate jackets of the lower pipes of said separate series, and gas return connections between the upper portion of said accumulator and the jackets of the upper pipe of said separate series.

WILLIAM M. MORGAN.